March 15, 1949.    R. A. GESELLSCHAP    2,464,303
CIRCUIT BREAKER
Filed May 1, 1944    6 Sheets-Sheet 1
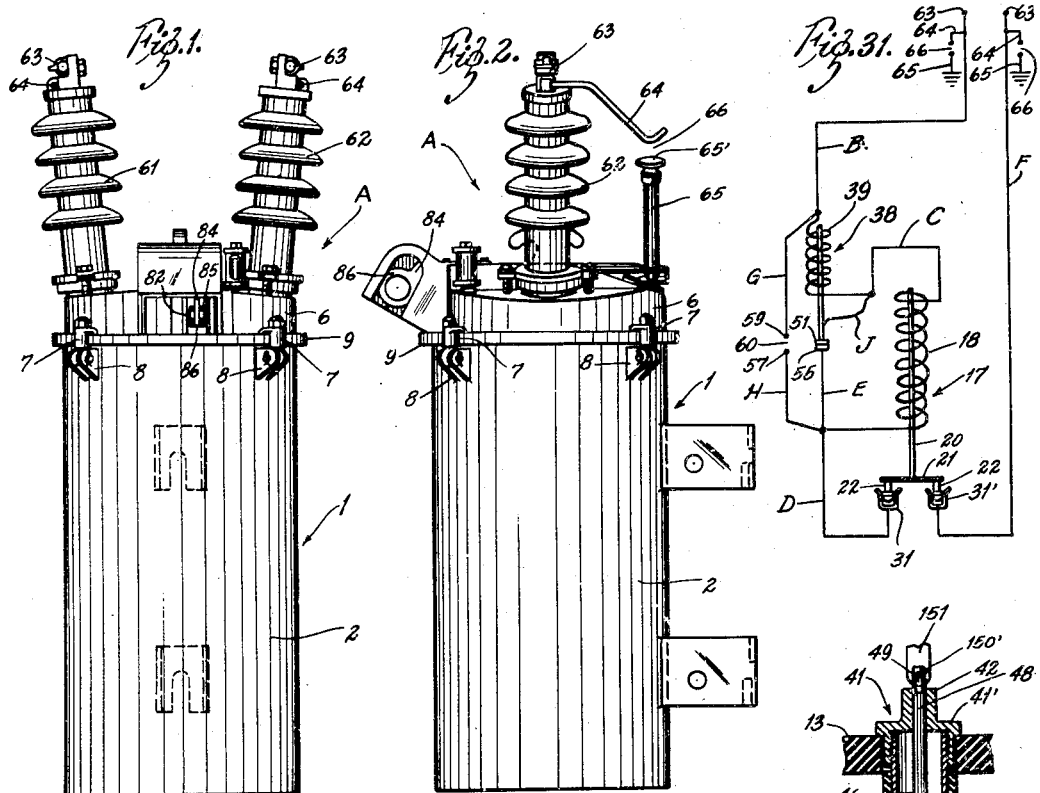
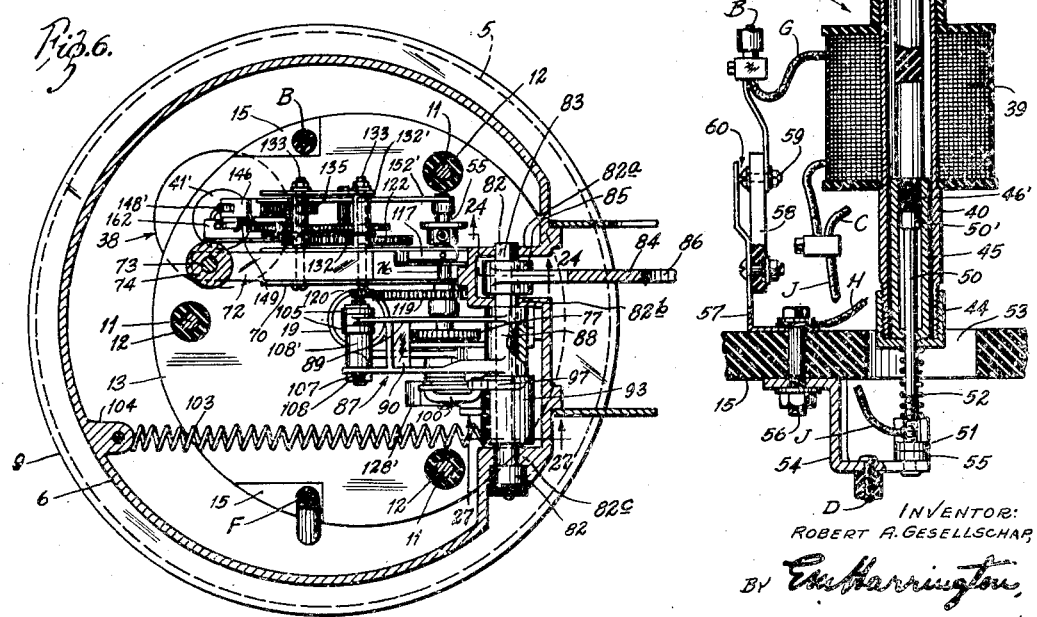
INVENTOR:
ROBERT A. GESELLSCHAP
BY Em Harrington
ATTORNEY.

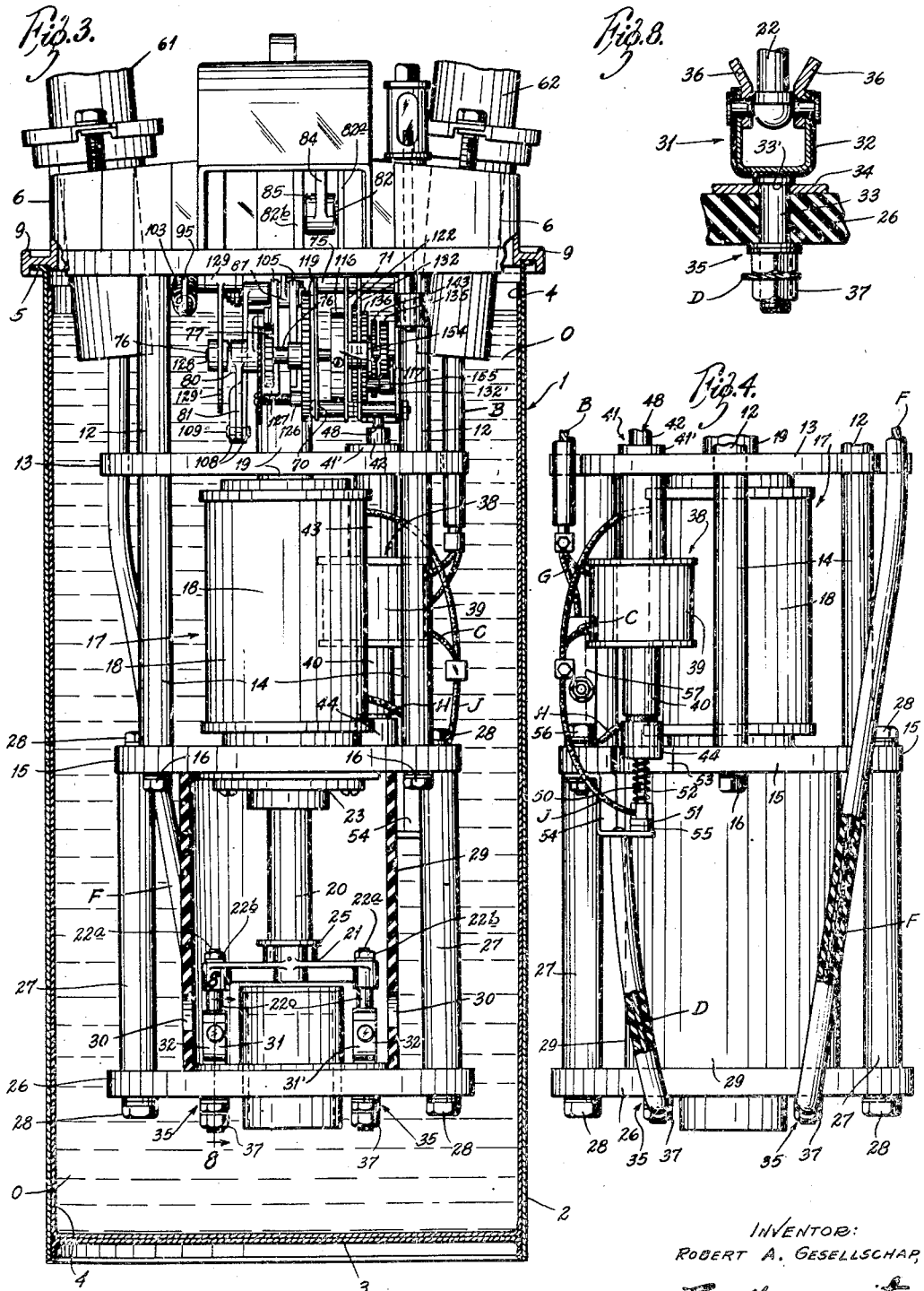

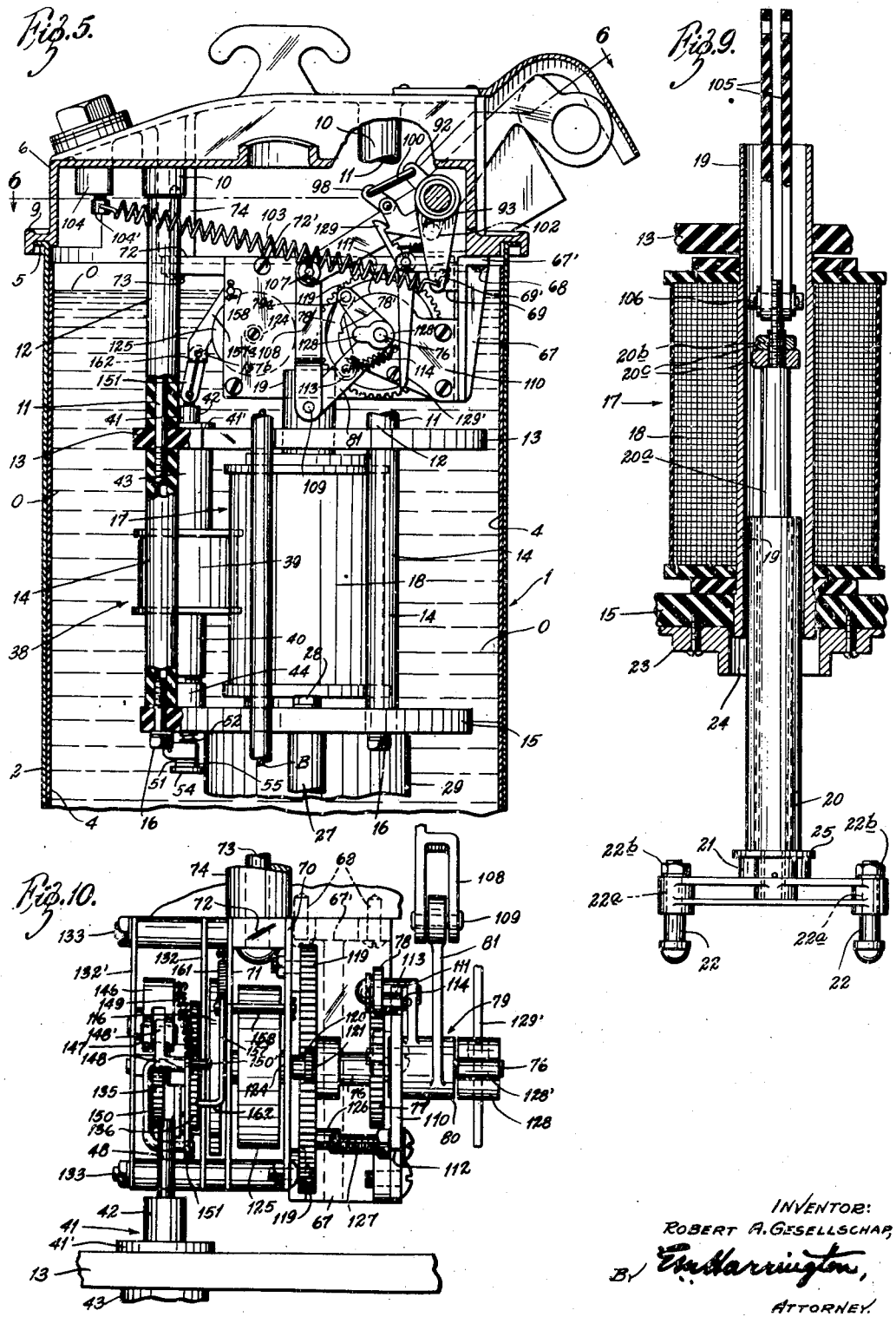

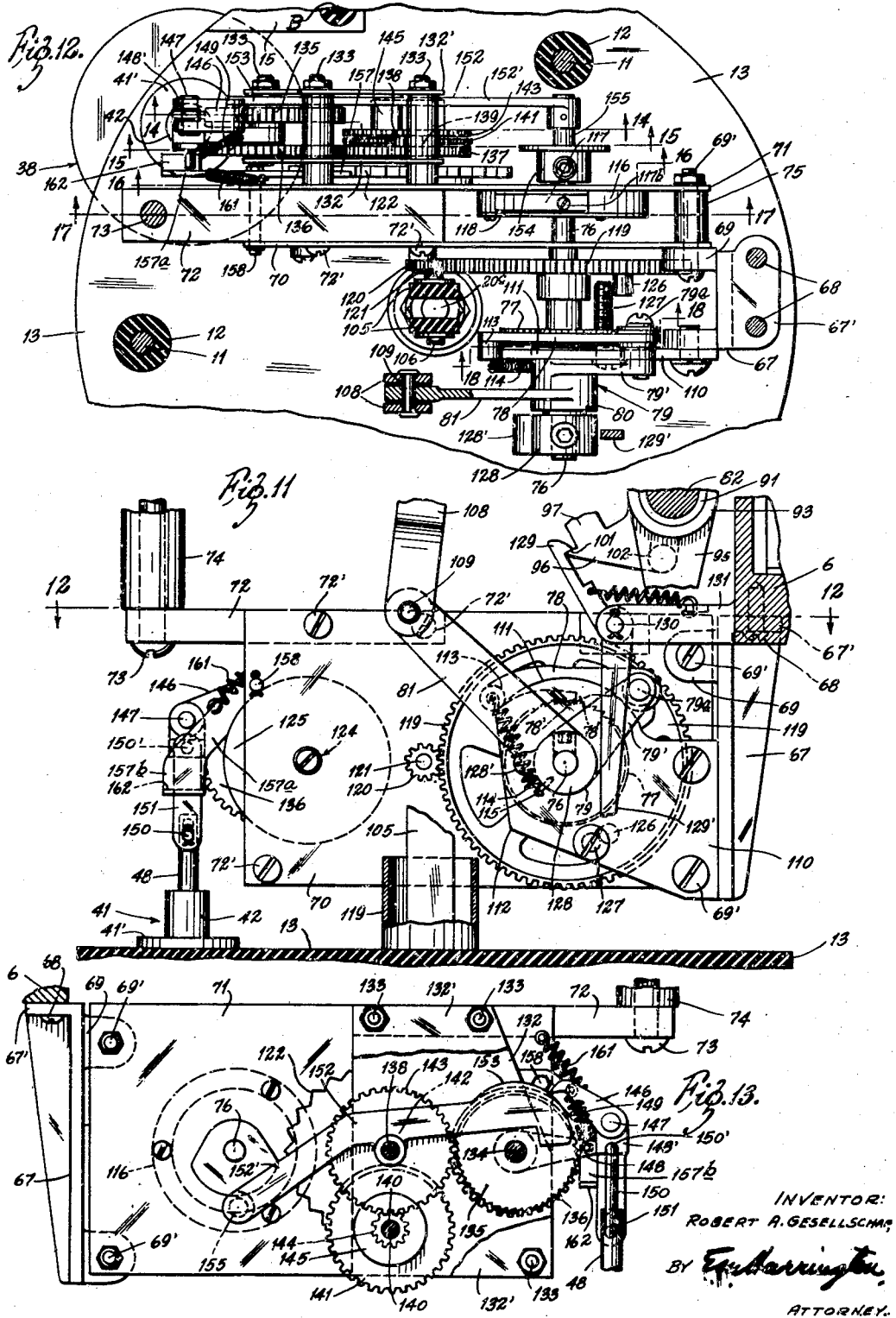

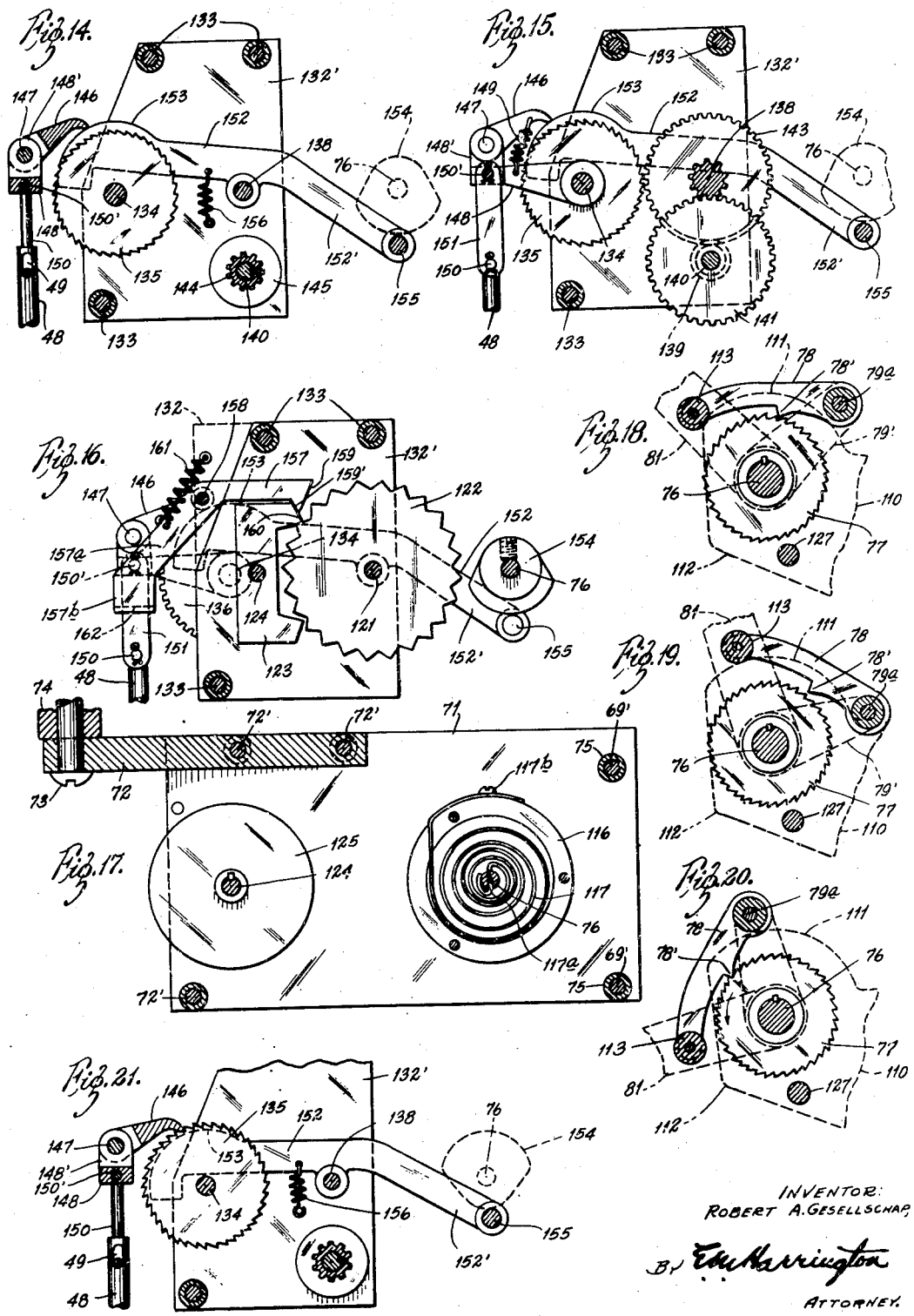

March 15, 1949.  R. A. GESELLSCHAP  2,464,303
CIRCUIT BREAKER
Filed May 1, 1944  6 Sheets-Sheet 6
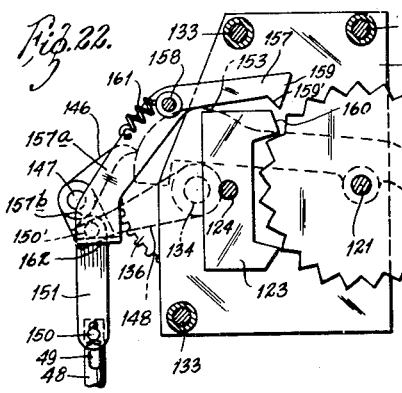
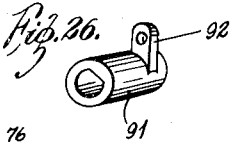
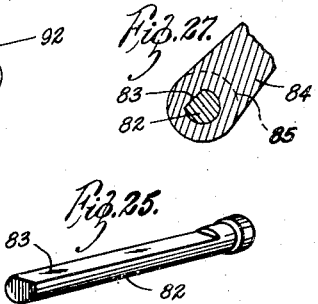
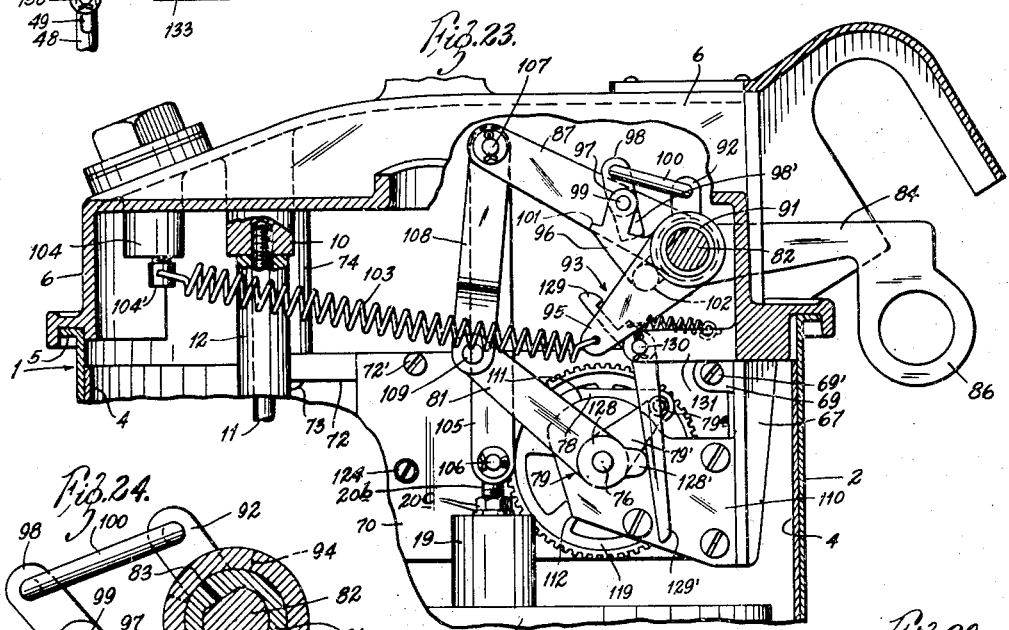
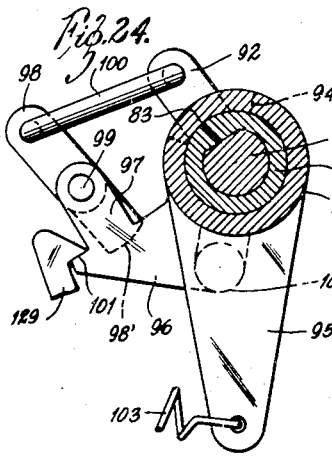
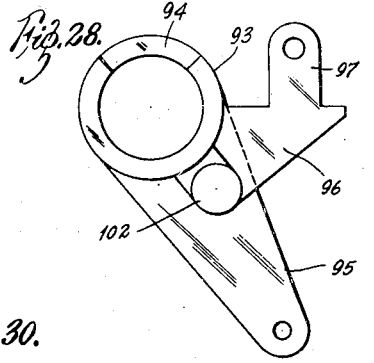
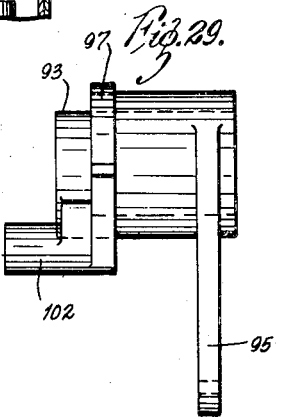
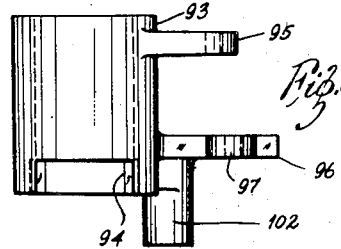
INVENTOR:
ROBERT A. GESELLSCHAP,
By Ern Harrington
ATTORNEY.

Patented Mar. 15, 1949

2,464,303

UNITED STATES PATENT OFFICE 2,464,303

CIRCUIT BREAKER

Robert A. Gesellschap, Brentwood, Mo., assignor to James R. Kearney Corporation, St. Louis, Mo., a corporation of Missouri Application May 1, 1944, Serial No. 533,532

8 Claims. (Cl. 200—89)

This invention relates generally to electrical protective devices for electrical circuits, and more specifically to oil circuit breakers, of the reclosing type, the predominant object of the invention being to provide an improved automatically operated, reclosing, oil circuit breaker which is well adapted for use with rural distribution lines to replace the single-shot and multiple-shot fused, sectionalizing devices formerly employed with such rural lines to afford protection to equipment electrically associated therewith.

For some years in the past it was the established practice in the operation of rural electrical distribution lines to provide protection for electrical equipment associated with the lines by interposing in the circuits single-shot or multiple-shot fused sectionalizing devices. However, of late years there has been a definite trend toward the replacement of such single-shot and multiple-shot fused, sectionalizing devices on rural distribution lines with small, single pole, automatically operated, reclosing, oil circuit breakers so located in the circuits as to provide a considerable advantage over the use of fused protective devices.

The average rural electrical distribution system in the United States is made up of about 470 miles of lines which radiate from a single supply substation. These lines extend out 40, 50, and in some cases, 60 miles from the source of supply of the electrical energy, and it is difficult and uneconomical to maintain routine patrolling of long extensions, necessary when fused protective devices are employed, because of poor roads, and lack of established roads in some sections where the lines are located, this being especially true under adverse weather conditions. Originally, many unnecessary outages were caused when single-shot, fused protective devices were used to protect equipment of rural circuits, and this led to the replacement of such single-shot devices by multiple-shot, fused protective devices. However, it was found that these repeaters, also, were inadequate to maintain proper service. The desire on the part of the operators of rural electrical distribution systems to reduce service interruptions and thereby improve service on the systems has contributed to the use of small, automatically operated, reclosing, oil circuit breakers which now are being used to a considerable extent.

While, in the use of oil circuit breakers of the types heretofore employed with rural electrical distribution lines, certain advantages were realized over the use of fused protective devices with such lines, yet, said oil circuit breakers did not function with the desired maximum efficiency inasmuch as such oil circuit breakers opened too rapidly on overloads on the lines, thus making it difficult to coordinate several circuit breakers in series, and to obtain coordination between circuit breaker and fused branches of a system. The oil circuit breaker disclosed herein is of such improved construction and arrangement that the disadvantage mentioned immediately above is completely overcome, this end being accomplished by providing the improved oil circuit breaker with time-delay mechanism which is so operable that the circuit breaker will open instantaneously on the first two openings, followed by two delayed openings before the circuit breaker locks out. As a result of this arrangement the instantaneous openings afford protection to equipment electrically associated with the distribution system and prevent conductor failures due to arc over, while a moderate time delay on the last two openings afford better coordination between circuit breakers arranged in series, and between circuit breaker and fused branches of a system.

Fig. 1 is a front elevation of the improved circuit breaker of the present invention.

Fig. 2 is a side elevation of the circuit breaker illustrated in Fig. 1.

Fig. 3 is an enlarged vertical section of the improved circuit breaker with the bushings at the top thereof broken away.

Fig. 4 is a fragmentary rear elevation of a portion of the circuit breaker, said circuit breaker portion being removed from the tank of the circuit breaker.

Fig. 5 is a fragmentary, vertical section showing the upper portion of the circuit breaker as same appears when viewed from the left side as the circuit breaker is illustrated in Fig. 1.

Fig. 6 is a horizontal section taken approximately on staggered line 6—6 of Fig. 5.

Fig. 7 is a fragmentary, vertical sectional view of a relay assembly which forms a part of the improved circuit breaker as will presently appear herein.

Fig. 8 is an enlarged, fragmentary, vertical section taken on line 8—8 of Fig. 3.

Fig. 9 is a fragmentary, vertical section illustrating a portion of the circuit breaker, including the operating coil and armature assembly and the associated contacts.

Fig. 10 is a fragmentary front elevation of the time-delay mechanism of the improved circuit breaker.

Fig. 11 is an enlarged, fragmentary side elevation of the time-delay mechanism illustrated in Fig. 10, with parts in section.

Fig. 12 is a fragmentary, horizontal section of the time-delay mechanism, taken on line 12—12 of Fig. 11.

Fig. 13 is a fragmentary side elevation of the time-delay mechanism viewed from the side opposite to that illustrated in Fig. 11, with parts shown in section.

Fig. 14 is a fragmentary, sectional detail taken approximately on line 14—14 of Fig. 12.

Fig. 15 is a fragmentary, sectional detail taken approximately on line 15—15 of Fig. 12.

Fig. 16 is a fragmentary, sectional detail taken approximately on line 16—16 of Fig. 12.

Fig. 17 is a fragmentary, sectional detail taken approximately on line 17—17 of Fig. 12.

Figs. 18, 19, and 20 are fragmentary details, partly in section and partly in elevation, illustrating parts of the time delay mechanism of the circuit breaker in different positions assumed by said parts during operation of the circuit breaker.

Fig. 21 is a fragmentary detail, partly in section and partly in elevation, showing parts of the time-delay mechanism illustrated in Fig. 16 in positions different from the positions assumed by said parts in that view.

Fig. 22 is a fragmentary detail similar to Fig. 16 but showing parts of the structure of Fig. 16 in changed positions.

Fig. 23 is an enlarged, fragmentary view, partly in vertical section and partly in elevation, showing the upper portion of the structure illustrated in Fig. 5, but with parts of said structure in changed positions.

Fig. 24 is a fragmentary detail, partly in section and partly in elevation, showing an assembly of parts included in the lock-out mechanism of the circuit breaker.

Figs. 25, 26, and 27 illustrate parts of the assembly illustrated in Fig. 24, Figs. 25 and 26 illustrating parts in perspective, and Fig. 27 showing associated parts in section.

Figs. 28, 29, and 30 illustrate another part of the assembly shown in Fig. 24, Fig. 28 illustrating the part in side elevation, Fig. 29 illustrating said part in front elevation, and Fig. 30 being a top plan view of the part.

Fig. 31 is a diagrammatical view illustrating the wiring of the improved circuit breaker.

In the drawings, wherein is shown for purposes of illustration merely, one embodiment of the invention, A designates in Figs. 1 and 2 the improved circuit breaker generally. The circuit breaker A includes a tank 1 comprising a body portion 2, of cylindrical or other suitable shape, which is closed at its bottom by a bottom wall 3 that is welded or otherwise secured in place (Fig. 3). Arranged within the tank 1, in contact with the side wall and the bottom wall thereof, is a lining member 4 which is formed of fiber or other material that is a good electrical insulator and which is not affected by contact therewith of the oil O within the tank. The body portion 2 of the tank 1 is provided at its upper end with an annular, outwardly projected flange 5, and the upper portion of the body portion of the tank 2 is closed by a head 6 which is secured in place by suitable clamping devices 7 spaced circumferentially of the tank (Figs. 1 and 2), said clamping devices being pivoted to members 8 secured to the body portion of the tank and being arranged to clampingly engage an annular, outwardly projected flange 9 formed on the head 6 of the tank.

Formed on the top wall of the head 6 of the tank 1, and projected downwardly therefrom, is a plurality of bosses 10, each having formed therein a tapped opening that is open at the bottom of the boss. The tapped openings of the bosses have screwed thereinto the screwthreaded upper end portions of vertically disposed rods 11, said rods throughout the major portions of their lengths being embraced by tubular spacers 12 formed of fiber or other suitable electrical insulating material. The spacers contact at their upper ends with the bottom faces of the bosses 10 and at their lower ends with the top face of a horizontally disposed plate 13, which likewise is formed of fiber or other suitable electrical insulating material, the plate 13 thereby being maintained in its proper spaced relation with respect to the tank head 6. The rods 11 extend through openings formed through the plate 13 and have screwthreaded lower end portions located beneath said plate (Fig. 5).

The plate 13 is secured in place by tubular spacers 14 which are internally screwthreaded at their upper ends and are screwed onto the screwthreaded, lower end portions of the rods 11, the plate 13 being clamped between the lower ends of the spacers 12 and the upper ends of the spacers 14. Also, a second horizontally disposed plate 15 is arranged in downward spaced relation with respect to the horizontal plate 13. The horizontal plate 15 is maintained in position by being secured to the lower end portions of the spacers 14, bolts 16 being employed which pass through openings formed through said plate 15 and the upper screwthreaded portions of the bolts being screwthreadedly received within the internally screwthreaded, lower portions of the spacers 14. The spacers 14 and the horizontal plate 15 are formed of fiber or other suitable electrical insulating material.

Supported between the horizontal plates 13 and 15 is an operating coil assembly 17 which comprises a coil 18 having a tubular core 19 through which operates an armature 20 (Fig. 9). The armature 20 is slidably supported by a rod 20a which has secured thereto at the lower end thereof a member 21 provided with a horizontally disposed arm portion at the opposite ends of which downwardly projected contacts 22 are mounted. In order to secure the contacts 22 to the horizontal arm portion of the member 21 said contacts are provided with portions 22a of reduced diameter that extend through openings formed through the opposite end portions of said arm portion, and nuts 22b are applied to the upper portions of these reduced portions to clamp the contacts in place. The coil 18 rests upon the horizontal plate 15, as is shown to good advantage in Fig. 9, and the lower portion of the tubular core extends through an opening formed through said plate 15 and projects slightly below same, the outer face of the core contacting closely with the wall of the opening formed through the plate 15. The rod 20a is provided with a screwthreaded portion 20b on which a pair of nuts 20c are mounted and which serve a purpose to be hereinafter set forth.

Secured to the horizontal plate 15 at the bottom face thereof is a member 23 which is shaped to provide a cavity 24 into which the lower end portion of the core 19 of the coil assembly projects slightly. This cavity 24 is of such shape and diameter that the upper portion 25 of the contact-supporting member 21 may pass into said cavity, when the armature approaches the limit of its upward movement, so as to function as a plunger therein which acts against the oil in the cavity to provide a hydraulic stop for the armature. Arranged in downward spaced relation with respect to the horizontal plate 15 is still another horizontal plate, a lower horizontal plate 26, which is formed of fiber or other suitable insulating material. The lower horizontal plate 26 is connected to the intermediate horizontal plate 15 by tubular spacers 27, formed of fiber or other suitable insulating material, said spacers being internally screwthreaded at their opposite ends, and bolts 28 being extended through openings formed through the plates 15 and 26 and screwed into said screwthreaded end portions of said spacers so as to anchor the lower horizontal plate 26 in place.

Supported between the horizontal plates 15 and 26 is a cylindrical member 29 which is formed of fiber or other suitable insulating material. The cylindrical member 29 is closed at its top by the horizontal plate 15 and at its bottom by the horizontal plate 26 to provide an arc-interrupting chamber, the wall of said cylindrical member having a vent opening 30 formed therethrough (Fig. 3). Disposed within the chamber provided by the cylindrical member 29, at the bottom thereof, is a pair of stationary contacts 31 and 31' into and out of electrical contact with which the movable, armature-supported contacts 22 are adapted to move.

The stationary contact 31 is shown to good advantage in Fig. 8 wherein the illustrated contact is shown as comprising a U-shaped portion 32 which is mounted at the upper end of a stud 33 that extends through openings formed through a flat sheet 34, which provides the bottom wall of the interrupting chamber, and through the lower horizontal plate 26. The lower portion of the stud of the stationary contact 31 is screwthreaded and a nut and washer assembly 35 is associated with said screwthreaded stud portion so that the washers closely engage the bottom face of the horizontal plate 26 and a shoulder 33' at the upper portion of the stud contacts firmly with the top face of the flat sheet 34. The U-shaped portions 32 of the stationary contact 31 has riveted, or otherwise fixed, to the opposed, upturned legs thereof, a pair of opposed contact elements 36 which are flared upwardly and outwardly so as to facilitate passage of the movable contact 22 therebetween, the U-shaped portion of the stationary contact being sufficiently resilient to permit the legs of said U-shaped portions to spread slightly when the movable contact 22 moves between the contact elements 36. Additionally, the studs 33 of the stationary contacts 31 and 31' have mounted on the lower screwthreaded portions thereof lower nuts 37 which serve to mechanically and electrically connect to the stationary contacts the electrical conductors leading thereto, said wires being clamped between the lower nuts 37 and the nuts of the nut and washer assemblies 35.

The improved circuit breaker disclosed herein includes a small, series relay 38 for controlling the operation of the circuit breaker. The relay 38, which is shown to good advantage in Fig. 7, comprises a coil 39 having a cylindrical core 40 extended therethrough and projected above and below same. The core 40 is externally screwthreaded at its opposite ends, the upper screwthreaded end portion of said core having screwthreadedly mounted thereon a cap 41 whose lower portion is disposed in an opening formed through the horizontal plate 13, and said cap being provided with an annular flange 41' which contacts with the top face of said horizontal plate 13. The upper portion of the cap provides an upwardly projected guide 42 which serves a function to be hereinafter referred to. Arranged in embracing relation with respect to the portion of the core extended between the top of the coil 39 and the lower face of the horizontal plate 13 is a cylindrical spacer 43. The lower, externally screwthreaded portion of the core 40 has screwthreadedly mounted thereon a cap 44 through the bottom wall of which an aperture is formed.

Disposed within the core 40 of the relay 38 is an armature 45 which is movable longitudinally of said core during operation of the relay, said armature 45, of course, being formed of electrical conducting material. The armature 45 is generally of tubular form and is internally screwthreaded at its upper end, and is provided with a wall at its lower end through which a centrally located opening is formed. The internally screwthreaded upper portion of the armature 45 receives an externally screwthreaded portion 46' of a rod 46 which extends through a portion of the core of the relay and outwardly beyond the cap 41 associated therewith. The rod 46 includes a portion 47 of relatively large diameter which is located immediately above the screwthreaded portion 46', and extended upwardly from this portion 47 is a rod portion 48 of reduced diameter which is bifurcated at its outer end and is provided with vertical slots 49 in the spaced legs of said bifurcated portion. The relay 38 includes also a rod 50 which is independent of the rod 46 and is disposed in part within the armature 45, said rod 50 being provided with an enlarged head 50' at its upper end and being extended through the opening in the bottom wall of the armature and through the similar opening formed through the bottom wall of the cap 44. The rod 50 has secured to its lower end portion an electrical contact 51, and interposed between the lower wall of the cap 44 and the top portion of the contact 51 is a coil spring 52 that embraces the rod 50 and tends to move the rod 50 and its contact 51 in a downward direction.

The relay 38 is so arranged that the rod 50 extends through an opening 53 formed through the horizontal plate 15, and supported by said horizontal plate 15 is a bracket member 54 which has fixed thereto an electrical contact member 55 into and out of electrical contact with which the contact member 51 is adapted to move in response to operation of the relay 38. The bracket member 54 is formed of electrical conducting material and it is secured to the horizontal plate 15 by a bolt 56, which also is formed of electrical conducting material, said bolt serving, additionally, to secure to the horizontal plate 15 an element 57 formed of electrical conducting material, the bolt 56 acting to electrically connect the bracket 54 and the element 57. Secured to the element 57 is a vertically disposed strip of suitable electrical insulating material 58, through which is extended a bolt 59 formed of electrical conducting material, the upper portion of the element 57 being offset slightly with respect to the lower portion thereof and this offset element portion being spaced from the head of the bolt 59 so as to provide a coil-protecting gap 60 therebetween.

Mounted on the head 6 of the tank 1 is a pair of bushings 61 and 62 which are suitably secured to said tank head. At their upper portions the bushings 61 and 62 are provided with suitable terminals 63 to which are connected incoming and outgoing conductors which serve to transmit electrical energy to the circuit breaker A. Also, suitably connected to the terminals of the bushings 61 and 62 are conductors which are electrically associated with various parts of the circuit breaker. The latter conductors are illustrated diagrammatically in Fig. 31 wherein is shown a conductor B which leads from the terminal 63 of the bushing 61 to the coil 39 of the relay 38. Leading from the coil of the relay 38 to the coil 18 of the operating coil assembly 17 is a conductor C, and leading from said coil 18 is a conductor D which is connected to the stationary contact 31 of the circuit breaker. Additionally, the conductor D which leads from the coil 18 of the operating coil assembly 17 has connected thereto a conductor E which connects the stationary contact 55 of the relay 38 to said conductor D and hence to the stationary contact 31 to which the conductor D is connected. The wiring illustrated diagrammatically in Fig. 31 includes also a conductor F which leads from the stationary contact 31' of the circuit breaker to the terminal 63 of the bushing 62. Also, a pair of conductors G and H form parts of the wiring arrangement to the circuit breaker, the conductor G leading from the point where the conductor B connects into the coil 39 of the relay 38 to the bolt 59, and the conductor H leading from the element 57 associated with the relay 38 to the point where the conductor D connects into the coil 18 of the operating coil assembly 17. The gap 60, previously mentioned herein, is arranged in the current path provided by the conductors G and H. A conductor J connects the movable contact 51 of the relay 38 to the conductor C.

In order to protect the circuit breaker from surges due to lightning or other causes, surge arrester assemblies are associated with the bushings 61 and 62. These arrester assemblies comprise arms 64, formed of electrical conductive material, which are mechanically and electrically connected to the terminals 63 of said bushings 61 and 62, and upstanding structures 65, supported by the head 6 of the tank 1, which include portions formed of electrical conductive material that are electrically connected to said tank head. The arms 64 and the heads 65' of the upstanding structures 65 are spaced apart to provide gaps 66 and the tank 1 is grounded, hence adequate surge protection will be afforded the circuit breaker in an obvious manner.

As previously stated herein, the predominant feature of the present invention is that the circuit breaker is adapted, on a sustained fault to open four times in succession and then lock out, the circuit breaker remaining so locked out until the fault has been removed from the line and the circuit breaker is reclosed manually. The first two openings of the circuit breaker are instantaneous, and are followed by a third and a fourth opening which are retarded by an inertia-type time delay mechanism. The time delay mechanism will now be described.

The time delay mechanism of the improved circuit breaker A includes a supporting frame comprising a vertically disposed bracket 67 provided with a horizontal flange 67' at its upper end which is secured by suitable fastening devices 68 to a lower face portion of the head 6 of the tank 1 at a side of said tank head (Fig. 5). Projected from the bracket 67 is an ear 69 to which is attached by a suitable securing element 69' a vertically disposed plate 70. Associated with said plate 70 is a similar plate 71, said plates 70 and 71 being spaced apart transversely of the circuit breaker, as is shown to good advantage in Fig. 12. Interposed between upper portions of the plates 70 and 71, and extended outwardly beyond same, is a horizontally arranged bar 72, said bar being secured to said plates by suitable fastening elements 72', and the outer extended end portion of said bar 72 being secured by a fastening element 73 to an elongated boss 74 which is projected downwardly from the top wall of the tank head 6. The fastening element 69' serves also to attach the plate 71 to the ear 69 of the bracket 67, said fastening element 69' being in the form of an elongated bolt which passes through both of the plates 70 and 71 and having a nut associated therewith, and a tubular spacer 75, which embraces the shank of said bolt, being interposed between said plates 70 and 71 (Fig. 12).

The plates 70 and 71 support for rotation a horizontally disposed shaft 76 on which is fixedly mounted for rotation therewith a ratchet wheel 77. The ratchet wheel has associated therewith a pawl 78, which is shaped as is shown to good advantage in Figs. 18, 19, and 20, said pawl comprising an elongated member having an extension 78' shaped and arranged to engage the teeth of the ratchet wheel 77. The pawl is pivotally attached at one of its ends, by a pivot member element 79a, to an arm 79' of a member 79, said member 79 including a hub portion 80 which is supported by the shaft 76 for movement with respect thereto, and the arm 79' being extended outwardly from said hub portion, the hub portion 80 of the member 79 having extended therefrom also a second arm 81.

Located above and slightly to a side of the shaft 76 is a shaft 82, which is supported for rotary motion by portions 82a, 82b and 82c of the head 6 of the tank 1 (Fig. 6). The shaft 82 is generally of circular cross-sectional shape but is provided with a flat portion 83, shown to good advantage in Figs. 24 and 27, which extends throughout the major portion of the length of the shaft (Fig. 25). The shaft 82 has mounted thereon an arm 84 which is provided with a hub portion 85 at its inner end, and a ring or eye 86 at its outer end, the hub portion having a bore formed therethrough which corresponds in shape to the cross-sectional shape of the portion of the shaft 82 having the flattened portion 83, and the hub portion of the arm being mounted on a part of the flattened portion of the shaft so that it will rotate with the shaft. Mounted also on the shaft 82 is a lever structure 87 (Fig. 6) which comprises a hub portion 88 through which the shaft 82 extends and a pair of substantially parallel arms 89 extended from said hub portion, said parallel arms being joined by a transverse web 90 adjacent to their outer ends. The hub portion 88 of the lever structure 87 is mounted on a part of the flattened portion of the shaft 82 but the bore through said hub portion is completely circular, and therefore said hub portion may oscillate about said flattened shaft portion without restraint because of the flat face thereof.

Additionally, the shaft 82 has mounted on the flattened portion thereof an element 91 (Figs. 24 and 26) which comprises a hub portion having a bore shaped in accordance with the cross-sectional shape of said shaft portion so that said element will rotate with the shaft 82. The outer surface of the hub portion of the element 91 is circular and said hub portion has extended outwardly therefrom an ear 92. Supported by the element 91 is a member 93 which includes a hub portion that embraces the hub portion of said element 91 (see Fig. 24) with the face of the bore of the hub of the member 93 in sliding contact with the outer face of the hub of the element 91 so as to permit said hub portion of said member 93 to oscillate about said hub portion of said element 91. The hub portion of the member 93 is provided with an arcuate recess 94 at an end thereof through which the ear 92 of the element 91 extends (Fig. 24).

The member 93 includes also an arm 95 which extends from the hub portion thereof, and an arm structure 96 which likewise extends from said hub portion and is spaced from the arm 95, longitudinally of the hub portion of said member 93. The arm structure 96 is provided with an ear 97 to which a short lever 98 is pivoted by the pivot element 99, the opposite, or outer, end of said short lever having pivotally attached thereto a link 100 which is pivotally connected at its opposite end to the ear 92 of the element 91 (Fig. 24). The arm structure includes a latch-engaging face 101, which serves a purpose to be hereinafter set forth, and a horizontally disposed abutment element 102 which performs a function to be hereinafter described. Additionally, the outer end of the arm 95 of the member 93 has attached thereto an end portion of a coil spring 103 whose opposite end is connected to an anchoring element 104' arranged in screwthreaded engagement with a part 104 of the head 6 of the tank 1.

Pivotally connected to the lever structure 87 is a pair of spaced, parallel arms 105 which extend downwardly from said lever structure and are pivotally connected at their lower ends by a pivot element 106 to the upper end portion of the rod 20a of the operating coil assembly 17 (Fig. 9). The upper end portions of the spaced, parallel arms are arranged at opposite sides of the outer end portion of one of the arms 89 of the lever structure 87 (see Fig. 6) and a pivot element 107 which is supported by the outer end portions of both of the arms 89 of the lever structure 87 serves to pivotally attach said upper end portions of the spaced, parallel arms 105 to the lever structure 87. Also, the pivot element 107 pivotally connects the upper end portion of an arm 108 to the lever structure 87, this arm 108 including a sleeve portion 108' at its upper end which embraces the pivot element 107 in interposed relation with respect to one of the spaced arms 105 and one of the arms 89 of the lever structure (Fig. 6). At its lower end the arm 108 is pivotally connected by a pivot element 109 to the outer end portion of the arm 81 of the member 79.

The shaft 76, previously mentioned herein, extends through a vertically disposed plate 110 which is supported by the bracket 67 (Figs. 11 and 12). At its top edge the plate 110 is provided with a curved cam face 111, and at its lower, forward portion said plate is provided with a corner-like portion 112 which provides another cam face. The pawl 78 is provided at its free end with a roller 113 (Figs. 18, 19, and 20) which at times during the operation of the circuit breaker is adapted to ride on the cam face 111 and at other times is adapted to contact with the cam face 112, there being a coil spring 114, attached at one of its ends to the free end of the pawl and attached at its opposite end to a suitable anchoring element 115 fixed to the hub portion of the member 79, which tends to draw the free end portion of the pawl 78 inwardly toward the shaft 76. It will hereinafter appear that the pawl 78 moves with the member 79 about the shaft 76 and that during a portion of such movement the extension 78' of said pawl engages the teeth of the ratchet wheel 77 to rotate the ratchet wheel and the shaft 76 on which it is fixedly mounted.

However, it is to be noted that when the roller 113 of the pawl 78 is in contact with the cam face 111 of the plate 110 the extension 78' of the pawl is raised out of contact with the teeth of the ratchet wheel 77, as is shown in Fig. 19, and that the extension of the pawl is likewise moved out of engagement with the teeth of ratchet wheel when the roller of the pawl contacts with the cam face 112. In other words, the extension 78' of the pawl 78 engages the teeth of the ratchet wheel 77 only during that portion of the movement of the pawl about the shaft 76 when the roller 113 of the pawl is traveling between the forward edge of the cam face 111 and the cam face 112.

By referring to Fig. 12 it will be noted that a housing 116 is provided which is secured to the plate 71. This housing, which is shown to good advantage in Fig. 17, is provided with a torsional spring 117 which is enclosed within the housing. As is shown in Fig. 17 the inner end portion of the torsional spring is anchored to the shaft 76 at 117a and the opposite end portion of said torsional spring is secured to the housing 116 at 117b. The housing 116 is closed at its front by a plate 118 as shown in Fig. 12, and this plate is omitted in Fig. 17. From the foregoing it is obvious that while the shaft 76 is being rotated by coaction between the pawl 78 and the ratchet wheel 77 the torsional spring will be wound to increase the tension thereof, and that when the extension of the pawl is disengaged from the teeth of said ratchet wheel 77 by contact of the roller 113 of said pawl with the cam face 112, the torsional coil spring will tend to rotate the shaft 76 in the reverse direction to the direction of rotation imparted to said shaft by the pawl 78.

Fixedly mounted on the shaft 76 for rotation therewith is a gear wheel 119, and arranged in mesh with said gear wheel is a pinion 120. The pinion 120 is fixedly mounted on a shaft 121 which is supported for rotation by the spaced plates 70 and 71, previously mentioned herein, and at its opposite end said shaft 121 has fixedly mounted thereon a toothed escapement wheel 122 with which is associated an escapement pawl 123 (Fig. 16). The escapement pawl 123 is fixedly mounted on a shaft 124 which is supported by the spaced plates 70 and 71 for slight oscillatory movement with respect thereto, and also fixedly mounted on said shaft 124 is a weight 125 (Fig. 17) which is disposed between said spaced plates 70 and 71. It is obvious that as the shaft 76 is rotated by coaction between the pawl 78 and the ratchet wheel 77, the gear wheel 119 will be likewise rotated, and because of the operation of the escapement mechanism made up of the wheel 122 and the pawl 123, the speed of rotation of said shaft 76 will be limited. Additionally, with regard to the gear wheel 119, it is pointed out that a pin 126 is fixed to said gear wheel and projects therefrom (Fig. 12). Also, the plate 110 supports a screwthreaded element 127 which serves as an abutment with which the pin 126 contacts to limit the reverse rotary movement to which the shaft 76 is subjected by the torsional coil spring 117 when the extension 78' of the pawl 78 is disengaged from the teeth of the ratchet wheel 77, as has been previously explained herein.

The shaft 76 has fixedly mounted thereon, at an end thereof, a cam 128 which is provided with a high spot 128'. The cam 128 rotates with the shaft 76, and the high spot of the cam is adapted to contact with the lower arm portion 129' of a latch 129, said latch being attached by a pivot 130 to an arm 131 for pivotal movement about said pivot 130. The latch 129 is adapted to engage the latch face 101 of the arm structure 96, as is shown in Fig. 24, and when said latch so engages said latch face the member 93 is held in the position shown in Fig. 24. When so positioned the coil spring 103 tends to move the arm 95 of the member 93 to the left, but, because the latch 129 engages the latch face 101 of the arm structure 96 of said member 93, movement of the member 93 is prevented. However, when the high spot 128' of the cam 128 engages and moves the lower arm portion of the latch 129, the upper portion of said latch is disengaged from the latch face 101 of the arm structure 96, whereupon the coil spring 103 moves the member 93 to the position in which it is shown in Fig. 23. When the member 93 is moved by the coil spring 103 as described, the element 91 and the shaft 82 are rotated by the link 100 so as to move the arm 84 to its lowered position as shown in Fig. 23. Also, movement of the member 93 from the position shown in Fig. 24 to the position shown in Fig. 23 upon disengagement of the latch 129 from the latch face 101 of the arm structure 96 of said member 93, will result in the abutment element 102 of the member 93 engaging beneath a portion of the lever structure 87 so as to raise said lever structure to the position in which it is shown in Fig. 23, whereby the contacts 22 will be raised upwardly and will be disengaged from the stationary contacts 31 and 31' to lock out the circuit breaker.

By referring to Fig. 12 it will be noted that a pair of plates 132 and 132' are supported by the plate 71 in spaced relation with respect thereto, the plate 132 being in closely spaced relation with respect to said plate 71, while the plate 132' is disposed in wider spaced relation with respect to the plate 132. The plates 132 and 132' are secured to the plate 71 by suitable bolts 133 which are embraced by spacers that are disposed between the plate 71 and the plate 132 and between the plates 132 and 132'. The plates 132 and 132' support for rotation a shaft 134 on which is fixedly supported for rotation therewith a ratchet wheel 135 and a gear wheel 136 that are arranged in spaced relation. Arranged in mesh with the gear wheel 136 is a similar gear wheel 137 that is mounted on a shaft 138, and arranged in mesh with said gear wheel 137 is a pinion 139 which is mounted on a shaft 140. Also, mounted on the shaft 140 is a gear wheel 141 which meshes with a pinion 142 that is mounted on the shaft 138, and rotatable with said pinion 142 is a gear wheel 143 which meshes with a pinion 144 that is mounted on the shaft 140. The shaft 140 also supports a fly wheel 145 that is rotatable with the pinion 144.

By referring particularly to Figs. 14, 15, and 21, it will be noted that a pawl 146 is provided whose outer free end is adapted to engage the teeth of the ratchet wheel 135, as is shown in Fig. 21. This pawl 146 is attached by a pivot 147 to a portion 148' of an arm 148 which is supported by the shaft 134 for oscillatory movement with respect thereto, a portion of said arm being interposed between the ratchet wheel 135 and the gear wheel 136 and this arm portion being provided with an opening through which the shaft 134 passes. The pawl 146 has associated therewith a coil spring 149 (Fig. 15) which tends to draw the outer, free end of the pawl into engagement with the teeth of the ratchet wheel 135, one end portion of said coil spring being attached to the pawl and the opposite end thereof being attached to the arm 148. As has been previously stated herein, the upper portion of the rod portion 48 of the relay 38 is bifurcated and the spaced parts of said bifurcated portion are provided with the vertically extended slots 49. These slots have extended therethrough the lower portion of a link 150, said link being U-shaped as is shown in Fig. 10, and the upper portion of said link being extended through an opening formed through a portion of the arm 148 (see Fig. 21). Also, the link 150 includes a flat strip of material 151 (Fig. 10) which is provided with apertures through which outer parts of the upper and lower portions of the U-shaped part of the link extend, cotter pins being provided which retain the flat strip of material in its assembled relation with respect to the U-shaped part of the link.

The ratchet wheel 135 has associated with it an arm 152 (Figs. 14, 15, 16, and 21) which is supported for pivotal movement by a portion of the shaft 138. A portion of the arm 152 is disposed immediately adjacent to the ratchet wheel 135 and in contact with a side face thereof and this arm portion is provided with an arcuate cam face 153, the curvature of said cam face corresponding approximately with the curvature of the toothed, circumferential face of the ratchet wheel. The arm 152 includes, also, a tail portion 152' which inclines downwardly to a point where its extreme end portion is disposed adjacent to an end portion of the shaft 76. The end portion of the shaft 76, adjacent to which the end of the tail portion of the arm 152 is located, has fixedly mounted thereon for rotation therewith a cam 154, and this cam engages a pin 155 which is fixed to the end portion of the tail portion 152' of the arm 152 (Figs. 14, 15, 16, and 21).

The arm 152 is provided with a coil spring 156 which tends to move said arm to the position shown in Fig. 21, where the cam face 153 of the arm 152 is located inwardly slightly of the bases of the teeth of the ratchet wheel 135, and when the arm 152 is so positioned the pawl 146 may engage the teeth of the ratchet wheel for imparting rotary movement to said ratchet wheel. However, the cam 154 is provided with a high portion, and during certain phases of the operation of the circuit breaker said high portion of the cam will depress the outer end of the tail portion 152' of the arm 152 so as to elevate the cam face 153 of the arm 152 to the position in which it is shown in Figs. 14 and 15. The pawl 146 overlaps the cam face 153 of the arm 152, and, therefore, when said cam face is elevated as shown in Figs. 14 and 15, the pawl is prevented from engaging the teeth of the ratchet wheel 135 and will slide along the cam face 153 of the arm 152 during movement of the pawl about the shaft 134 without imparting rotary movement to the ratchet wheel.

The escapement pawl 123 has associated with it a locking element 157 (Fig. 16) which is supported for pivotal movement by a pivot 158, said locking element being provided with an extension 159 having an inclined face 159' which is adapted to engage a correspondingly inclined face 160 formed on the escapement pawl 123 to prevent actuation of said escapement pawl. The locking element 157 is provided with a coil spring 161 which tends to move said locking element to the position in which it is shown in Fig. 16, where the inclined face 159' of the locking element engages the inclined face 160 of the escapement pawl 123. The locking element 157 includes an inclined portion 157a, and a lower, substantially vertical portion 157b, said vertical portion 157b being provided at its lower end with a horizontally disposed flange 162 (Fig. 10). It will be noted from Fig. 10 that the horizontal flange 162 of the locking element 157 is disposed beneath and in vertical alinement with an extension 150' of the link 150 which connects the pawl arm 148 to the rod portion 48 of the relay 38. As a result of this situation the extension 150' of the link 150 engages the flange 162 of the locking element, when the link is in its lowered position, so as to elevate the end portion 159 of said locking element out of engagement with the escapement pawl 123. However, as the relay 38 is actuated to cause the rod portion 48 to move upwardly, the link 150 likewise moves upwardly, thereby disengaging the link extension 150' from the flange of the locking element and permitting the coil spring 161 to move the locking element to a position where its portion 159 engages and locks the escapement pawl 123, as is shown in Fig. 16.

In describing the operation of the improved circuit breaker it is pointed out that when the contacts 51 and 55 of the relay 38 are in their normal contacting relation a shunt path is provided across the terminals of the main operating coil 17, and that very little current passes through the operating coil until an overload occurs. Upon occurrence of an overload the armature 45 and the rod 46 of the relay 38 move upwardly with respect to the rod 50, the top face of the bottom wall of the armature eventually engaging the lower face of the enlarged head 50' of the rod 50 so as to cause the rod to move upwardly with the armature and rod and thereby move the contact 51 upwardly away from the contact 55, against the force of the coil spring 52, so as to interrupt the shunt path across the terminals of the operating coil 17. Upon separation of the relay contacts 51 and 55, as described, the overload current is diverted through the operating coil 17, thereby causing the armature 20 of the operating coil to move upwardly with respect to the rod 20a at high speed. During such upward movement of the armature 20 of the operating coil the upper end thereof strikes the lowermost nut 20c, associated with the rod 20a, and drives said rod 20a upwardly so as to rapidly raise the contacts 22 out of contact with the stationary contacts 31 and 31' and thereby interrupt the circuit.

When the rod 20a moves upwardly, as described, on passage of overload current through the operating coil 17, such upward movement is transmitted by the spaced arms 105 to the outer end of the lever structure 87 and said lever structure swings about the shaft 82. Also, swinging movement of the outer portion of the lever structure 87 is transmitted to the arm 81 of the member 79 by the arm 108 so as to rotate the hub portion of said member 79 about the shaft 76 and thereby cause the pawl 78 to be moved in a clockwise direction by the arm 79' of the member 79 about the ratchet wheel 77. The circuit breaker is locked out only after four opening operations and, therefore, as the circuit breaker recloses after each of the first three opening operations the pawl 78 will engage the teeth of the ratchet wheel 77 and rotate the shaft 76 in a counter clockwise direction during such reclosing operations of the circuit breaker. Such rotation of the shaft 76 during reclosing operations of the circuit breaker will bring into operation the escapement mechanism made up of the escapement wheel 122, the escapement pawl 123, and the pawl weight 125 with the result that downward or reclosing movement of the contacts 22 will be retarded so as to give the fault an opportunity to clear. However, as the contacts 22 approach the stationary contacts 31 and 31' the roller 113 at the outer, free end of the pawl 78 engages the cam face 112 (Figs. 18, 19, and 20) so as to disengage the pawl from the teeth of the ratchet wheel 77, whereupon the contacts 22 move rapidly into electrical contact with said stationary contacts 31 and 31'.

As has been previously stated herein the first and second opening operations of each series of four opening operations of the circuit breaker are rapid, while the third and fourth opening operations of each such series of opening operations are relatively slow. The speed of the opening operations is controlled by the arm 152 (Figs. 14, 15, and 21) whose pin 155 is engaged by the cam 154 which is fixed to the shaft 76. On the first two opening operations of any series of opening operations of the circuit breaker the cam face 153 of the arm 152 is held outwardly of the teeth of the ratchet wheel 135 by the cam 154, as is shown in Figs. 14 and 15, and therefore the free end of the pawl 146 will ride along the cam face 153 of said arm 152 and will thereby be prevented from engaging the teeth of the ratchet wheel 135. However, as the cam 154 rotates with the shaft 76 during reclosing operations of the circuit breaker, said cam 154 will reach a position just prior to the third and fourth opening operations of the circuit breaker, where the coil spring 156 may move the arm 152 to a position where its cam face 153 is located inwardly of the bases of the teeth of the ratchet wheel 135, as is shown in Fig. 21, thus permitting the free end of the pawl 146 to engage the teeth of said ratchet wheel. Therefore, the first two operations of the relay 38 of each series of four opening operations of the circuit breaker will be rapid because the speed of operation of said relay is in no manner retarded, the pawl 146 merely sliding along the smooth cam face 153 of the arm 152. However, during the third and fourth opening operations of any series of opening operations of the circuit breaker, the pawl 146 engages the teeth of the ratchet wheel 135, and because an additional burden is imposed on the relay of rotating the ratchet wheel 135, and the gear wheel, pinion, and fly wheel assembly associated therewith, the speed of operation of the relay is substantially retarded and more time is required to separate the relay contacts 51 and 55.

As has been previously stated all of the reclosing operations of the circuit breaker are retarded by the escapement mechanism, while the last two opening operations of each related series of opening operations of the circuit breaker are likewise retarded as is explained immediately above. These time delays are provided to permit sufficient time for the fault to clear, if it should not be a sustained fault. In the event the fault should clear before the circuit breaker has gone through its complete cycle of four opening operations, the circuit breaker will, of course, remain in its reclosed position, during which the roller 113 of the pawl 78 is in contact with the cam face 112 and said pawl is disengaged from the teeth of the ratchet wheel 77. The torsional spring 117 (Fig. 17) may then restore the shaft 76 and the parts associated therewith to their initial positions. In connection with the operation of the torsional spring 117 it is pointed out that the successive operations of a related series of operations of the circuit breaker are so rapid that said torsional spring may not rotate the shaft 76 in a clockwise direction to restore said shaft to its initial position. It is only when the circuit breaker remains closed on clearance of the fault, or when the circuit breaker is locked out that the torsional spring 117 functions to restore the shaft 76 to its normal, initial position.

It is to be noted that when the relay 36 is being actuated, that is, while the rod 46 is moving upwardly from its normal lowered position and is returning to such lowered position, the escapement mechanism provided by the escapement wheel 122 and the escapement pawl 123 is locked by the locking element 157. This arrangement prevents retrograde motion being imparted to the shaft 76 by the pawl 78 as its extension 78' rides over the teeth of the ratchet wheel 77 during opening movement of the circuit breaker. Obviously, when the circuit breaker starts a reclosing operation the rod 46 of the relay 36 will have reached its lowermost position and the locking element 157 will have been raised out of engagement with the escapement pawl 123 to release the shaft 76 for rotation.

In the event that the circuit breaker goes through its complete cycle of operations without the fault being cleared, the circuit breaker locks out after the fourth opening operation. This result is brought about by the high spot 128' of the cam 123 on the shaft 76 moving the lower arm portion 129' of the latch 129 so as to disengage said latch from the latch face 101 of the arm structure 96, thereby freeing the member 93 for such movement by the spring 103 as will cause the abutment 102 of said member 93 to engage beneath a portion of the lever structure 87 and raise said lever structure, as shown in Fig. 23, so as to elevate the main contacts 22 of the circuit breaker out of contact with the associated stationary contacts 31 and 31'. When the circuit breaker locks out, the arm 84 moves to the position in which it is shown in Fig. 23, and this is the only time when said arm 84 moves to such position, as on all opening operations other than the fourth opening operation of a related series of opening operations the hub portion of the lever structure merely oscillates about the shaft 82 without imparting rotary movement thereto.

When it is desired to close the circuit breaker after it has been locked out, a suitable switch stick is employed for moving the outer end portion of the arm 84 upwardly by engaging the finger of the stick with the eye of said arm. This operation rotates the shaft 82 and the element 91 associated with said shaft, the ear 92 of said element 91 engaging an end wall of the arcuate recess 94 and rotating the member 93 about the shaft 82 to tension the coil spring 103 and cause the latch face 101 of said member 93 to be engaged by the latch 129. It is obvious that the circuit breaker cannot be closed in on a fault and held closed by the arm 84, because the various mechanisms which cause the opening and reclosing operations of the circuit breaker to be performed are operable independently of said arm 84. If it be desired to actuate the circuit breaker manually to the locked out position, the arm 84 is pulled downwardly with the aid of a switch stick. This operation rotates the shaft 82 and its associated element 91 (Fig. 24) in a clockwise direction thereby causing such pivotal movement to be imparted to the lever 98 by the link 100 as will cause the tail portion 98' of said lever 98 to contact with and disengage the latch 129 from the latch face 101 of the arm structure 96, thereby permitting the coil spring 103 to move the circuit breaker to its locked out position as has been previously explained herein.

While the improved circuit breaker disclosed herein is described as being operable to obtain two quick opening operations and two delayed opening operations, it is to be understood that the invention is not limited to such precise sequence of operations, as the circuit breaker may be arranged to function so as to provide any desired combination of quick and delayed opening operations without departing from the spirit of the invention.

I claim:

1. An automatic reclosing circuit breaker comprising a plurality of main contacts, an operating coil having terminals and adapted when energized to separate said main contacts, a relay coil, contacts associated with said relay coil which when closed complete a shunt path across the terminals of said operating coil and which are adapted to be separated when said relay coil is energized by an overload current to interrupt said shunt path and thereby cause the overload current to be diverted through said operating coil to separate said main contacts, means for locking said main contacts in open relation after a predetermined number of opening and reclosing operations of said main contacts, means operable by said relay coil for delaying opening of said shunt contacts on energization of said relay coil by an overload current, and means for normally rendering said delaying means inoperative and operated by said locking means to render said delaying means operative.

2. An automatic reclosing circuit breaker comprising a plurality of main contacts, an operating coil having terminals and adapted when energized to separate said main contacts, a relay coil, contacts associated with said relay coil which when closed complete a shunt path across the terminals of said operating coil and which are adapted to be separated when said relay coil is energized by an overload current to interrupt said shunt path and thereby cause the overload current to be diverted through said operating coil to separate said main contacts, means for locking said main contacts in open relation after a predetermined number of opening and reclosing operations of said main contacts, means operable by said relay coil including an inertia type time-delay mechanism for delaying opening of said shunt contacts on energization of said relay coil by an overload current, and means for normally rendering said delaying means inoperative and operated by said locking means to render said delaying means operative.

3. An automatic reclosing circuit breaker comprising a plurality of main contacts, an operating coil having terminals and adapted when energized to separate said main contacts, a relay coil, contacts associated with said relay coil which when closed complete a shunt path across the terminals of said operating coil and which are adapted to be separated when said relay coil is energized by an overload current to interrupt said shunt path and thereby cause the overload current to be diverted through said operating coil to separate said main contacts, means for locking said main contacts in open relation after a predetermined number of opening and reclosing operations of said main contacts, means operable by said relay coil for delaying opening of said shunt contacts on energization of said relay coil by an overload current, means for normally rendering said delaying means inoperative and operated by said locking means to render said delaying means operative, and means actuated by said locking means for retarding reclosing operations of said main contacts.

4. An automatic reclosing circuit breaker comprising a plurality of main contacts, an operating coil having terminals and adapted when energized to separate said main contacts, a relay coil, contacts associated with said relay coil which when closed complete a shunt path across the terminals of said operating coil and which are adapted to be separated when said relay coil is energized by an overload current to interrupt said shunt path and thereby cause the overload current to be diverted through said operating coil to separate said main contacts, means for locking said main contacts in open relation after a predetermined number of opening and reclosing operations of said main contacts, means operable by said relay coil for delaying opening of said shunt contacts on energization of said relay coil by an overload current, means normally rendering said delaying means inoperative and operated by said locking means to render said delaying means operative, and means actuated by said locking means and including an escapement mechanism for retarding reclosing operations of said main contacts.

5. An automatic reclosing circuit breaker comprising a plurality of main contacts, an operating coil having terminals and adapted when energized to separate said main contacts, a relay coil, contacts associated with said relay coil which when closed complete a shunt path across the terminals of said operating coil and which are adapted to be separated when said relay coil is energized by an overload current to interrupt said shunt path and thereby cause the overload current to be diverted through said operating coil to separate said main contacts, means for locking said main contacts in open relation after a predetermined number of opening and reclosing operations of said main contacts, means operable by said relay coil for delaying opening of said shunt contacts on energization of said relay coil by an overload current, means actuated by said locking means and cooperating with said delaying means in a manner to control operation of said delaying means, means actuated by said locking means for retarding reclosing operations of said main contacts, said means including an escapement mechanism, and means for locking said escapement mechanism during opening operations of said movable main contact.

6. An automatic reclosing circuit breaker comprising a plurality of main contacts, an operating coil having terminals and adapted when energized to separate said main contacts, a relay coil, contacts associated with said relay coil which when closed complete a shunt path across the terminals of said operating coil and which are adapted to be separated when said relay coil is energized by an overload current to interrupt said shunt path and thereby cause the overload current to be diverted through said operating coil to separate said main contacts, means for locking said main contacts in open relation after a predetermined number of opening and reclosing operations of said main contacts, means operable by said relay coil for delaying opening of said shunt contacts on energization of said relay coil by an overload current, means operated by said locking means for retarding reclosing operations of said main contacts, said means including an escapement mechanism, and means actuated in response to actuation of said relay coil for locking said escapement mechanism during opening operations of said movable main contact.

7. An automatic reclosing circuit breaker comprising a plurality of main contacts, an operating coil having terminals and adapted when energized to separate said main contacts, a relay coil, contacts associated with said relay coil which when closed complete a shunt path across the terminals of said operating coil and which are adapted to be separated when said relay coil is energized by an overload current to interrupt said shunt path and thereby cause the overload current to be diverted through said operating coil to separate said main contacts, means for locking said main contacts in open relation after a predetermined number of opening and reclosing operations of said main contacts, means operable by said relay coil for delaying opening of said shunt contacts on energization of said relay coil by an overload current, means operated by said locking means for retarding reclosing operations of said main contacts, said means including an escapement mechanism, and means comprising a spring-urged pivotally supported element adapted to engage a part of said escapement mechanism in response to actuation of said relay coil for locking said escapement mechanism during opening operations of said movable main contact.

8. An automatic reclosing circuit breaker comprising a plurality of main contacts, an operating coil having terminals and adapted when energized to separate said main contacts, a relay coil, contacts associated with said relay coil which when closed complete a shunt path across the terminals of said operating coil and which are adapted to be separated when said relay coil is energized by an overload current to interrupt said shunt path and thereby cause the overload current to be diverted through said operating coil to separate said main contacts, means for locking said main contacts in open relation after a predetermined number of opening and reclosing operations of said main contacts, means operable by said relay coil for delaying opening of said shunt contacts on energization of said relay coil by an overload current, and means actuated by said locking means and cooperating with said delaying means in a manner to control operation of said delaying means, said delaying means including an inertia type time-delay mechanism comprising an assembly made up of gear wheels, pinions, and a fly wheel.

ROBERT A. GESELLSCHAP.

REFERENCES CITED

The following references are of record in the file of this patent:

UNITED STATES PATENTS

| Number | Name | Date |
|---|---|---|
| 980,812 | Meter et al. | Jan. 3, 1911 |
| 1,154,359 | Basch | Sept. 21, 1915 |
| 1,537,727 | Anderson | May 12, 1925 |
| 1,790,485 | Ramey | Jan. 27, 1931 |
| 2,069,082 | Walle | Jan. 26, 1937 |
| 2,210,669 | Johnson | Aug. 6, 1940 |
| 2,295,805 | Palmer | Sept. 15, 1942 |
| 2,333,604 | Wallace | Nov. 2, 1943 |
| 2,349,632 | May | May 23, 1944 |